United States Patent
Roselius et al.

[11] 3,923,847
[45] Dec. 2, 1975

[54] METHODS OF PRODUCING COCOA BUTTER

[75] Inventors: Wilhelm Roselius, Bremen-St. Magnus; Otto Vitzthum, Bremen; Peter Hubert, Bremen-Lesum, all of Germany

[73] Assignee: Studiengesellschaft Kohle m.b.H., Mulheim (Ruhr), Germany

[22] Filed: May 23, 1973

[21] Appl. No.: 363,098

[52] U.S. Cl. .......................... 260/412.8; 260/412.8
[51] Int. Cl.² ........................................... C11B 1/10
[58] Field of Search ................................ 260/412.8

[56] References Cited
UNITED STATES PATENTS
2,735,624  2/1956  Beck .............................. 260/412.8
3,064,018  11/1962  Bruera ........................... 260/412.8
3,093,480  6/1963  Arnold ........................... 260/412.8

FOREIGN PATENTS OR APPLICATIONS
1,057,911  2/1967  United Kingdom ............. 260/412.8

Primary Examiner—Elbert L. Roberts
Attorney, Agent, or Firm—Burgess, Dinklage & Sprung

[57] ABSTRACT

Process of extracting cocoa butter from sources thereof by use of supercritical gases which are solvents therefor, especially carbon dioxide.

9 Claims, 1 Drawing Figure

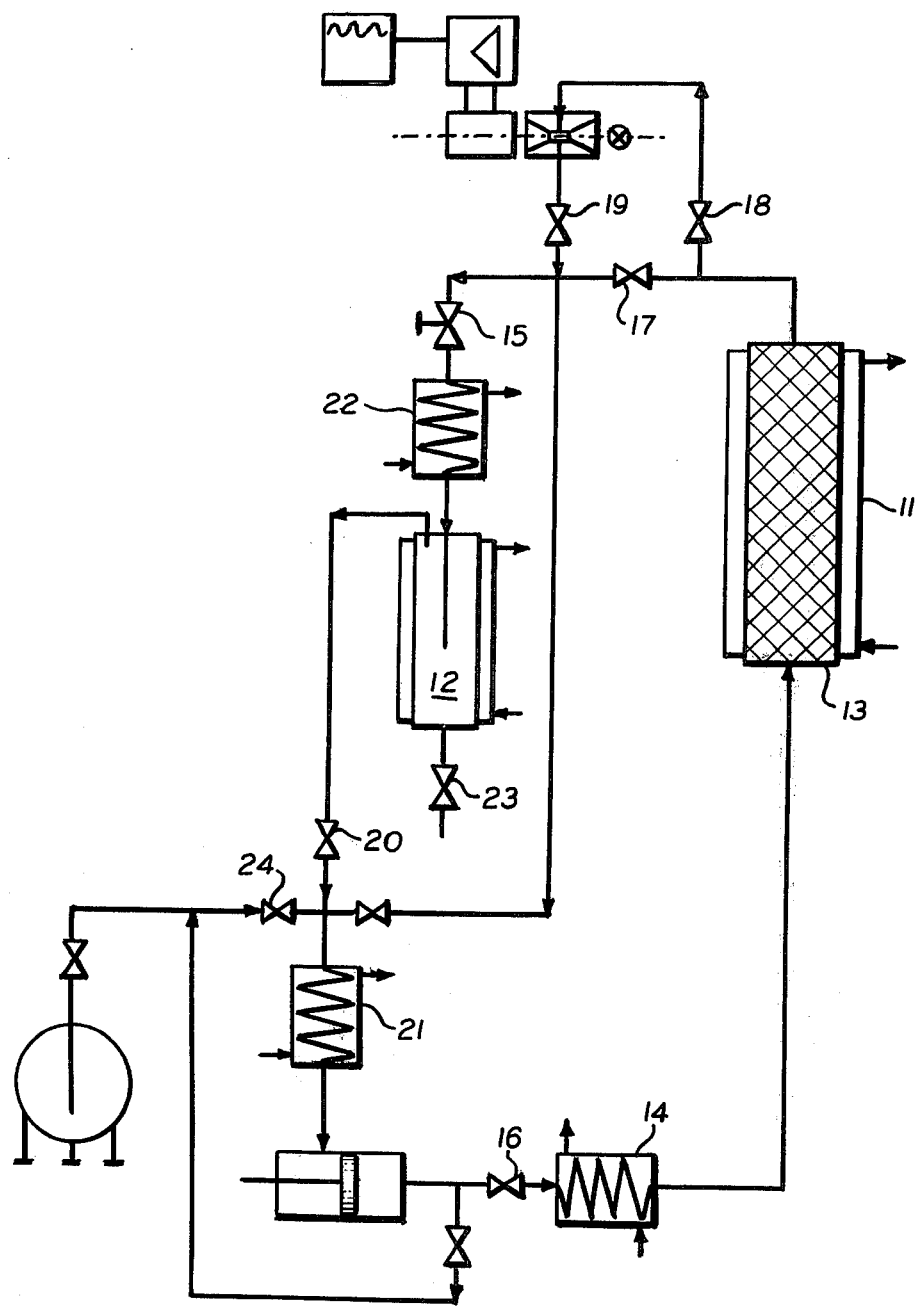

METHODS OF PRODUCING COCOA BUTTER

This invention relates to a method for producing cocoa butter.

The methods of producing cocoa butter which are customary at the present time may be classified as follows:
1. Expression of the cocoa butter from the cocoa mass;
2. Expression of cocoa butter from cocoa nibs; and
3. Extraction of cocoa butter from cocoa mass, cocoa nibs, cocoa press-cakes, or cocoa powder by means of organic solvents.

In countries where particularly high quality is demanded, only pressing methods rather than extraction methods may be used. The main reason for this is that in the latter case the relatively high boiling point solvents have to be removed not only from the cocoa butter but also from the extraction residue, and it is doubtful whether it is possible to remove all residues or traces. Moreover, in the case of extraction the entire fat content is usually removed from the cocoa, so that the remaining cocoa powder is practically valueless. In addition, the extraction methods are applied to damaged cocoa material and to cocoa and chocolate waste, and this has led to the discrediting of the method as the low quality cocoa butter produced by this means is frequently added as an adulterant to high grade cocoa butter. Detection methods have even been evolved for this reason, in order to enable the addition of extract butter to be detected analytically, (E. Lauber, A. Fincke, H. Meyer, J. Wurziger, et al., for a survey of literature on this subject see J. Kleinert, Gordain 64, 174–189 (1964)).

For the processing of cocoa mass, pressing methods have been introduced for some time, whereas the production of cocoa butter from nibs in continuously working expeller presses is more recent. Compared with the pressing of cocoa mass, the use of screw or expeller presses leads to a product containing a particularly high proportion of waste matter, which in both cases must be removed. The processing of the resulting press residues to form cocoa powder is difficult, while it is also difficult to obtain a constant fat content in the residue.

Pressing methods have the common feature that they entail considerable technical effort and consequently high cost.

The present invention provides a new method for the production of cocoa butter from cocoa nibs or cocoa mass, and in which it is in principle immaterial whether or not the cocoa nibs are roasted or whether or not the material has been alkalinised. The method is based on the observation that various gases, which are supercritical in respect of pressure and temperature, constitute excellent solvents for cocoa fat which moreover are completely unobjectionable from the health point of view, i.e. are food-acceptable.

Accordiing to the invention there is provided a method for the production of cocoa butter from cocoa mass or from unroasted or roasted crushed cocoa nibs by extraction with solvents wherein the cocoa product is subjected to extraction with food-acceptable gas which is supercritical in respect of both pressure and temperature. The cocoa butter can be thereafter separated from the solution e.g. by varying the pressure and/or temperature.

Carbon dioxide is particularly preferred as the extraction medium, but the same results are obtained if use is made instead of $N_2O$, $SF_6$, $CF_3Cl$, $CHF_2Cl$, $CF_2=CH_2$, $C_3F_8$, $CHF_3$, ethane and ethylene, which are unobjectionable gases from the point of view of health. To attain the degree of purity required to be food-acceptable, the selected solvent can be distilled or otherwise purified before use.

When solvents other than $CO_2$ are used, the limits in respect of pressures and temperatures which are indicated in Cases 1 to 4 hereinafter should be obtained correspondingly from critical data described in literature.

It has been found that, for example, $CO_2$ will dissolve cocoa fat even in the liquid state, but when it passes to the supercritical state the properties of $CO_2$ are modified abruptly in the direction of considerably greater dissolving power. This also applies to the gases mentioned above.

By way of example, a specific embodiment of the invention will now be described with reference to the accompanying drawing which shows, diagrammatically, the apparatus employed. The embodiment involves the use of carbon dioxide as the extraction solvent gas, but it is to be understood that other suitable solvent gases, for example those listed above, or mixtures thereof could be used in place of the carbon dioxide, appropriate changes being made to take account of different critical pressures and temperatures of such a solvent gas.

In a preferred embodiment of the invention which is illustrated by the accompanying drawings, the procedure is as follows: (the values $P_1$ and $t_1$ relate to the pressure and temperature conditions in the extraction vessel 11, while $P_{1,2}$ and $t_2$ relate to the extraction vessel 12).

Cocoa mass or crushed cocoa nibs are introduced without special pre-treatment and without additions (such as for example lecithin in the pressing method) into the pressure tube 13 and the entire plant is first flushed free of air by means of $CO_2$. The extraction medium is then drawn by suction from the liquid gas tanks and the medium, which in the first instance is still liquid, is forced by means of a pump into the heat exchanger 14, in which it is brought to supercritical conditions in respect of pressure and temperature. It then enters tube 13, passes through the contents of the latter, and is thereby charged with cocoa fat in the form of a supercritical solution. The inlet and outlet apertures of the vessel are closed by metal filter discs (filter threshold 3 micron) so that the entrainment of particles of cocoa is not possible. The "charged" supercritical gas phase is now expanded by means of a throttle valve 15 into the vessel 12 and it is ensured that the pressure falls to values lower than $P_{crit., CO_2}$. The system thereby separates, i.e. the pure cocoa butter is separated. If the temperature is left at values slightly above $t_{crit., CO_2}$, the fraction of water likewise entrained by the gas from the cocoa will not be separated from the mixture and will be further entrained by the current of $CO_2$, which is now free of extract. The cocoa butter is thus practically free from water. In principle it should be observed at this point that a reduction of pressure and/or a raising of the temperature will lead to the same effect, namely the disintegration of the system, so that a number of variants of the method are conceivable. When the desired pressure and temperature conditions have been adjusted in the vessels, the flow of gas from the liquid gas tanks is stopped and the circuit closed. The valves 15,16,17,18,19,20 are for this purpose open and all others closed. The gas leaving the vessel 12 is liquefied in the heat exchanger 21, delivered by the pump into the heat exchanger 14, in which it is brought to supercritical conditions again, and it passes as pure solvent back into the tube 13, and so on. Instead of the liquid gas pump it is also possible to use a compressor, in which case the liquefaction of the gas is not necessary. Which of these measures is selected will depend only on technical circumstances in the process, since in this case other heat exchangers are necessary.

As previously mentioned, pressures above 75.3 at., which is approximately equal to $P_{crit., CO_2}$, and temperatures above $t_{crit., CO_2}$ are necessary for the extraction. In practice a pressure above 100 atmospheres gauge, and preferably between 200 and 400 atmospheres gauge, is used. It is a particular feature of the method that in respect of temperature it is only necessary to work slightly above the critical temperature of $CO_2$, that is to say above 31.6°C, preferably between 40° and 60°C.

In practice the heat exchangers 14, 21 and 22 will be connected together, thus leading to a procedure which is very advantageous in respect of energy, and therefore economical.

By way of the valves 18, 19 an optical sight cell, through which part of the charged gas current flows, is incorporated in a by-pass. It is equipped with a light source, UV-detector, amplifier and recorder or electrical controller. This arrangement makes it possible for the course of the extraction to be followed accurately with the aid of calibration curves, and to switch off the installation as soon as the desired proportion of fat has been removed from the cocoa contained in vessel 11. In this way any desired degree of extraction can be achieved and reliably reproducible results will be achieved, which are better than the values obtained by conventional methods.

After completion of the processing, vessel 12 is first closed and all the gas contained in the remainder of the circuit is pumped back into the tanks. Valves 16,15,20,23, 24 are for this purpose closed, and all others are opened. Consequently practically no losses occur.

A slightly yellowish cocoa butter is obtained which is completely free from particles of cocoa matter and which can be used without further filtration or other processing, while it is in every respect, including aroma, equivalent to a conventional press product of the highest quality. A feature of the method which should be emphasised is that the composition of the cocoa butter will not vary even if not all but only part of the cocoa fat is extracted.

If crushed nibs are used, the residue found in 11 will be a material which is unchanged in colour and structure and which can easily be further processed. When cocoa mass is used, a powdery or crumbly material is obtained which can easily be handled and the colour of which has been only slightly lightened. The nibs or masses which have undergone extraction can therefore be further processed direct without other treatment.

The results indicated above and in the Table are also obtained in the same way in other variants of the method as described below. The only exception is Case 2, in which the cocoa butter has a slightly higher water content because of the liquefaction of the $CO_2$ in vessel 12.

I. DELIVERY MEANS: LIQUID GAS PUMP:

Case 1: As already described above, the following values must be used here:

| | |
|---|---|
| $P_2 < P_{crit.} < P_1$ | Absolute preferred values: |
| $t_1 \cong t_2 > t_{crit.}$ | $P_1 = 200-400$ at. gauge |
| | $t_1 = 40-60°C$ |
| | $P_2 =$ about 5 at. gauge above $P_{crit., gas}$ |
| | $t_2 =$ at least 5°C $> t_{crit., gas}$ |
| Case 2: | |
| $P_2 < P_{crit.} < P_1$ | Absolute preferred values: |
| $t_2 < t_{crit.} < t_1$ | $P_1$, $t_1$, $P_2 =$ see case 1 |
| | $t_2 =$ at least 5°C under $t_{crit., gas}$ |
| Case 3: | |
| $P_2 = P_1 > P_{crit.}$ | Absolute preferred values: |
| $t_2 > t_1 > t_{crit.}$ | $P_2$, $P_1 =$ see case 1 |
| | $t_2 = 80-150°C$ |
| | $t_1 =$ see case 1 |

Because $t_2$ is higher than $t_1$, additional aroma variants are here also contained in the cocoa butter.

| | |
|---|---|
| Case 4: | |
| $P_2 < P_{crit.} < P_1$ | Absolute preferred values: |
| $t_2 > t_1 > t_{crit.}$ | $P_1$, $P_2$, $t_1 =$ see case 1 |
| | $t_2 =$ see case 3 |

With regard to the aroma, the remarks made in connection with case 3 are also applicable here.

CONVEYOR: C B COMPRESSOR

The apparatus differs from that shown in the drawing only in that the conveyer is here a compressor. Before entering the compressor the current of gas must therefore be brought to supercritical temperatures in the heat exchanger 21, while in the exchanger 14 only the excess heat of compression is removed. Cases 1 to 4 can likewise be carried out, but here the heat exhchanges have different functions. In practice they are connected together, so that for example the heat of compression is partly used to supply the evaporation heat to the vessel 12 or to the exchanger 21. This also applies correspondingly to operation with a liquid gas pump.

Depending on the parameters applicable to the process, the processing times are between 0.5 and 7 hours.

The removal of the cocoa butter from the vessel 12 is particularly simple if the temperature in 12 is kept at or slightly above the clear melting point of the butter, if the pressure of the gas is lowered to a few atmospheres gauge and if the liquid cocoa butter is then run off through valve 23, degasification being affected simultaneously. It is moreover a particular feature of the process that with the exception of the pump and the automatic valves there are no moving parts. The installation can be cleaned to remove residues of fat in the pipes, when necessary, by operating the cycle without filling the tube 13, thus collecting the residues in the vessel 12, from which they are removed.

EXAMPLES 1. 2 kg of crushed cocoa nibs were processed in the installation illustrated in the drawing, Case 1, as follows:

Time: 5 hours
Extraction pressure $P_1 = 320$ at. gauge
Extraction temperature $t_1 = 45°C$ disintegration pressure $P_2 = 56$ at. gauge
disintegration temperature $t_2 = 38°C$
Results: 830 g ($\triangleq 74\%$ of the fat fraction contained) of slightly yellowish cocoa butter with a mild aroma were obtained.

Analytical data: see table. 2. 2 kg of cocoa mass were processed in the installation shown in the drawing, Case 2, as follows:

Time: 4 hours
Extraction pressure $P_1 = 350$ at. gauge
Extraction temperature $t_1 = 60°C$
disintegration pressure $P_2 = 53$ at. gauge
disintegration temperature $t_2 = 25°C$.

Result: 1160 g ($\triangleq 99\%$ of the extractable fat fraction) of light yellow cocoa butter with a strong aroma were obtained. The residue left behind was a powdery material with a slightly lightened colour as compared with the starting material and likewise with a good aroma.

Analytical data: see Table.

Table

| Material | Fat content | Degree of Extraction | Saponification number | Iodine number | Acid number | $n_D^{40}$ | Clear melting point |
|---|---|---|---|---|---|---|---|
| Example 1: | | | | | | | |
| Crushed cocoa nibs, unprocessed, % | 55.7 | | | | | | |
| Cocoa butter from above | | 74 % | 183 | 36 | 3.3 | 1.4572 | 33°C |
| Extracted crushed nibs | 24.3 | | | | | | |
| Example 2: | | | | | | | |
| Cocoa mass, unprocessed, % | 58.5 | | | | | | |
| Cocoa butter from above | | 99 % | 181 | 36 | 3.3 | 1.4571 | 34.4°C |
| Cocoa powder, residue : | 1.2 | | | | | | |
| Ordinary commercial cocoa butter | | | 192–197 | 32–42 | 0.9–3.4 | 1.4565–1.4580 | 33–35°C |

What is claimed is:

1. A method for the production of cocoa butter from cocoa mass or from roasted or unroasted cocoa nibs comprising the step of contacting said cocoa product with a food-acceptable solvent gas which is supercritical in respect of temperature and pressure for extraction of said cocoa butter by the solvent gas, and removing the solvent gas bearing the cocoa butter from the residue of said cocoa product.

2. A method according to claim 1 including the further step of recovering the cocoa butter from the resulting extract.

3. A method according to claim 2 wherein said recovery step is effected by lowering the pressure to below the critical pressure while maintaining the temperature above the critical temperature.

4. A method according to claim 2 wherein said recovery step is effected by lowering the pressure below the critical pressure while maintaining the temperature below the critical temperature.

5. A method according to claim 1 wherein said gas is selected from the group consisting of prepurified $N_2O$, $SF_6$, $CHF_3$, ethane, ethylene, $CF_3Cl$, $CHF_2Cl$, $CF_2=CH_2$, $C_3F_8$ and $CO_2$.

6. A method according to claim 1 wherein said gas is carbon dioxide.

7. A method according to claim 6 wherein the pressure at which the extraction is conducted is from about 200 atmospheres to about 400 atmospheres gauge.

8. A method according to claim 6 wherein the temperature at which the extraction is conducted is from about 40° to about 60°C.

9. A method according to claim 7, wherein the temperature at which the extraction is conducted is from about 40° to about 60°C.

* * * * *

UNITED STATES PATENT AND TRADEMARK OFFICE
CERTIFICATE OF CORRECTION

PATENT NO. : 3,923,847
DATED : December 2, 1975
INVENTOR(S) : Wilhelm Roselius, Otto Vitzthum and, Peter Hubert It is certified that error appears in the above-identified patent and that said Letters Patent are hereby corrected as shown below:

Column 1, line 34, change "Gordain" to --Gordian--.

Column 4, line 7, change "$\geq$" to -- $\geq$ --.

Signed and Sealed this

Twenty-fifth Day of January 1977

[SEAL]

Attest:

RUTH C. MASON
Attesting Officer

C. MARSHALL DANN
Commissioner of Patents and Trademarks